US007117781B2

(12) United States Patent
Lynn

(10) Patent No.: US 7,117,781 B2
(45) Date of Patent: Oct. 10, 2006

(54) PISTON BALANCING SYSTEM

(75) Inventor: William Harry Lynn, Kohler, WI (US)

(73) Assignee: Thomas Industries, Inc., Sheboygan, WI (US)

( * ) Notice: Subject to any disclaimer, the term of this patent is extended or adjusted under 35 U.S.C. 154(b) by 71 days.

(21) Appl. No.: 11/058,968

(22) Filed: Feb. 16, 2005

(65) Prior Publication Data

US 2006/0180019 A1   Aug. 17, 2006

(51) Int. Cl.
*F01B 9/00* (2006.01)
*F16C 3/04* (2006.01)

(52) U.S. Cl. .......................................... 92/140; 74/603
(58) Field of Classification Search ................ 992/140; 74/603

See application file for complete search history.

(56) References Cited

U.S. PATENT DOCUMENTS 4,509,378 A * 4/1985 Brown ........................ 74/603
5,644,969 A * 7/1997 Leu et al. ..................... 92/60.5

FOREIGN PATENT DOCUMENTS

DE     4122198 A  *  1/1992
DE   19903185 A1  *  8/2000

* cited by examiner

*Primary Examiner*—Thomas E. Lazo
(74) *Attorney, Agent, or Firm*—James B. Conte; Barnes & Thornburg LLP

(57) ABSTRACT

A piston pump or compressor has a dynamically balanced drive assembly in which nearly all of the rotational, oscillatory and axial forces on the rotating drive shaft are canceled. The piston is primarily balanced by adding an oscillating counter weight mounted to the connecting rod to convert oscillatory forces into rotational forces at the axis of an eccentric element mounting the piston to the drive shaft. The remaining unbalanced rotational forces are centered along the drive shaft by a rotating counter weight. A further counter weight is mounted to the drive shaft spaced along the drive shaft from the rotating counter weight to impart a counter moment on the drive shaft and essentially cancel the moment about a moment axis perpendicular to the drive shaft resulting from the axial spacing of the piston and the other two counter weights. A method of reducing vibration on a piston drive shaft is also disclosed.

9 Claims, 1 Drawing Sheet

PISTON BALANCING SYSTEM

CROSS-REFERENCE TO RELATED APPLICATION

Not applicable.

STATEMENT OF FEDERALLY SPONSORED RESEARCH OR DEVELOPMENT

Not applicable.

BACKGROUND OF THE INVENTION

The present invention relates to pumps and compressors and in particular to balancing piston drive assemblies in such devices.

One problem with conventional pumps and compressors is that they can create excessive noise and vibration as the piston(s) are reciprocated. The piston is typically eccentrically mounted to the drive shaft so that it travels back and forth in the stroke direction as it reciprocates in the cylinder. It is also weighted more heavily at the head where compression occurs. Thus, the force acting on the drive shaft is ordinarily not balanced about the axis of the drive shaft. Moreover, as the piston reciprocates between the pump and suction strokes, the force on the drive shaft changes.

To reduce this unbalance, the end of the piston opposite the head can be weighted. By adding the appropriate mass to the piston at a side of the drive shaft opposite the piston head, essentially equal and opposite oscillatory forces can be achieved with respect to the drive shaft. German publication DE 4122198 A1 discloses a counter weighted piston arrangement. Another German publication, DE 19903185 C2 discloses a drive assembly in which the loading on the drive shaft is even more in balance. Here, the oscillatory forces of the piston are balanced about an axis of the eccentric by a counter weight mounted to the lower end of the piston. Then, these forces centered on the eccentric are balanced about the drive shaft by another counter weight which is mounted to the drive shaft to rotate therewith. The rotating weight is concentric with the drive axis but is weighted to offset the forces at the eccentric axis which revolve about the drive axis as the drive shaft turns. With this assembly, therefore, the oscillatory and rotational forces are essentially balanced about the drive shaft axis. The entire disclosure of these publications are incorporated by reference as though fully set forth herein.

Even the improved balancing taught by the latter German reference, however, does not address the loading on the drive shaft that occurs in the direction of the drive axis. The axial distance between the force centered on the eccentric and the countering force at the rotating weight creates a moment, or shaking couple, on the drive shaft in the axial direction, such that unwanted vibration, and the corresponding noise and inefficiency, can remain.

This type of unbalancing is common in single cylinder pumps, however, it also occurs in multi-cylinder pumps. Even in opposed piston pumps where the pistons are 180° out of phase, the forces on the drive shaft can be unbalanced and cause the drive assembly to vibrate. The pistons are typically coupled to the drive shaft spaced apart along the drive axis, for example using a single retainer or eccentric element between the connecting rods of the pistons. Thus, a moment, or shaking couple, arises as the drive shaft rotates because of the axial spacing between the pistons even if they are otherwise balanced individually.

Accordingly, a piston drive assembly with better vibration dampening characteristics is needed.

SUMMARY OF THE INVENTION

The inventors of the present invention have determined that vibration occurs in a piston drive assembly by the occurrence of oscillatory, rotational and axial forces on the drive shaft, and that to optimally dampen vibration all three of these forces must be effectively canceled throughout the stroke of the piston. Dynamically balancing the oscillatory, rotational and axial forces of the drive assembly more effectively reduces vibration and improves the noise characteristics and efficiency of the pump.

In accordance with one aspect, the invention provides a drive assembly for a pump or compressor. The drive assembly has a rotatable drive shaft extending along a drive axis and a piston eccentrically mounted to the drive shaft about an eccentric axis which revolves about the drive axis when the drive shaft is rotated so as to effect reciprocal motion to the piston. A counter balance assembly is coupled to the piston and the drive shaft so as to essentially align oscillatory forces of the drive assembly along the eccentric axis and rotational forces of the drive assembly along the drive axis. A counter moment member coupled to the drive shaft is spaced along the drive axis from the piston and counter balance assembly and applies a moment to the drive shaft essentially equal and opposite to a moment effected by the piston and counter balance assembly acting about a moment axis that is perpendicular to the drive axis.

The piston can be primarily balanced by an oscillating counter weight that transfers oscillatory forces of the piston to the axis of an eccentric element mounting the piston to the drive shaft. The remaining unbalanced rotational forces can be centered along the drive shaft by a rotating counter weight. A further counter weight can be mounted to the drive shaft spaced along the drive axis from the piston and/or the rotating counter weight to impart a counter moment on the drive shaft to essentially cancel the moment on the drive shaft resulting from the axial spacing of the piston and the other two counter weights.

The weight providing the counter moment is preferably a rotating inertia wheel mounted directly to the drive shaft. The inertia wheel has one or more weights effecting an opposite moment on the drive shaft. The weight(s) are selected and sized to counter the moment of the piston and the other weights.

One of the counter weights can be mounted to the piston connecting rod at a side of the eccentric axis opposite the piston head to counter the force of the reciprocating mass of the piston and balance the forces about the axis of the eccentric. The other counter weight can be part of or mounted to an eccentric element that mounts the piston to the drive shaft. This rotating counter weight is asymmetric about the drive axis to counter the revolving mass centered at the eccentric axis and align the forces about the drive axis. The axial moment on the drive shaft is generated by the oscillating weight and piston being spaced axially from the rotating weight. This axial spacing of countering masses on a rotating shaft effects oppositely directed forces acting on the length of the shaft and thus creates a moment about a moment axis that is perpendicular to the drive shaft and its axis. This moment is canceled by the additional counter moment weight.

Another aspect of the invention provides a pump (or compressor) incorporating the dynamically balanced drive assembly described above. The pump would include a motor having the drive shaft and a crankcase housing the drive shaft and having a cylinder in which the piston reciprocates.

Yet another aspect of the present invention provides a method of reducing vibration on a piston drive shaft of a pump (or compressor). The method includes: mounting a first weight to the piston; mounting a second weight to the drive shaft such that the first and second weights are spaced apart along a drive axis; and mounting a third weight to the drive shaft spaced apart along the drive axis from the piston such that the third weight imparts a moment on the drive shaft that is essentially equal and opposite to a moment effected by the piston and first and second weights acting about a moment axis that is perpendicular to the drive axis.

The invention thus provides a pump or compressor with decreased shaking on the drive shaft and thus lower noise and improved efficiency. The invention disclosed herein can be modified to dynamically balance multi-cylinder pumps/compressors by balancing the oscillating forces of each piston on the drive shaft along a common eccentric axis and then countering the combined revolving forces along the drive shaft axis and then countering the combined moment on the drive shaft.

These and other advantages of the invention will be apparent from the detailed description and drawings. What follows is a description of a preferred embodiment of the present invention. To assess the full scope of the invention the claims should be looked to as the preferred embodiment is not intended to be the only embodiment within the scope of the invention.

DETAILED DESCRIPTION OF THE PREFERRED EMBODIMENT

Figure 1:
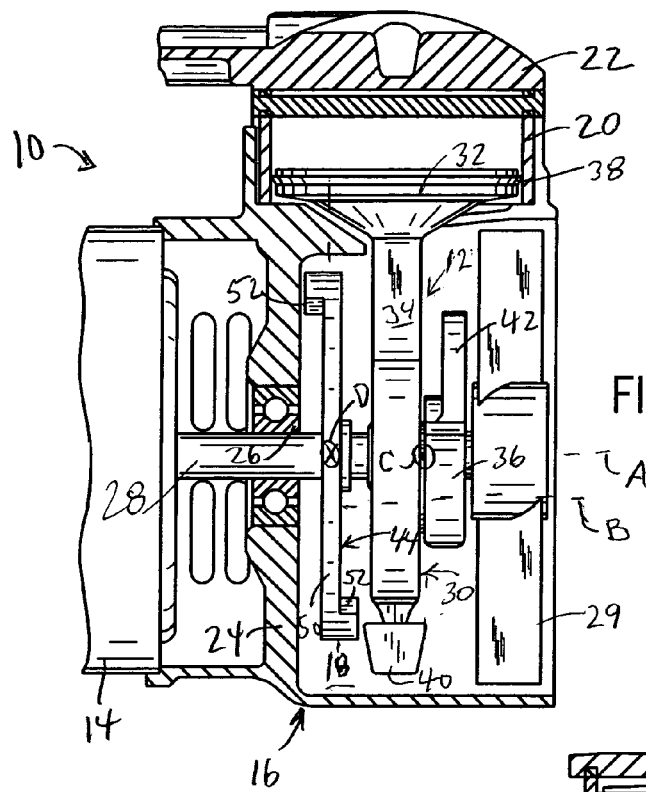
FIG. 1 is a vertical sectional view through a piston/cylinder arrangement of a pump showing a dynamically balanced drive assembly according to the present invention.
Figure 2:
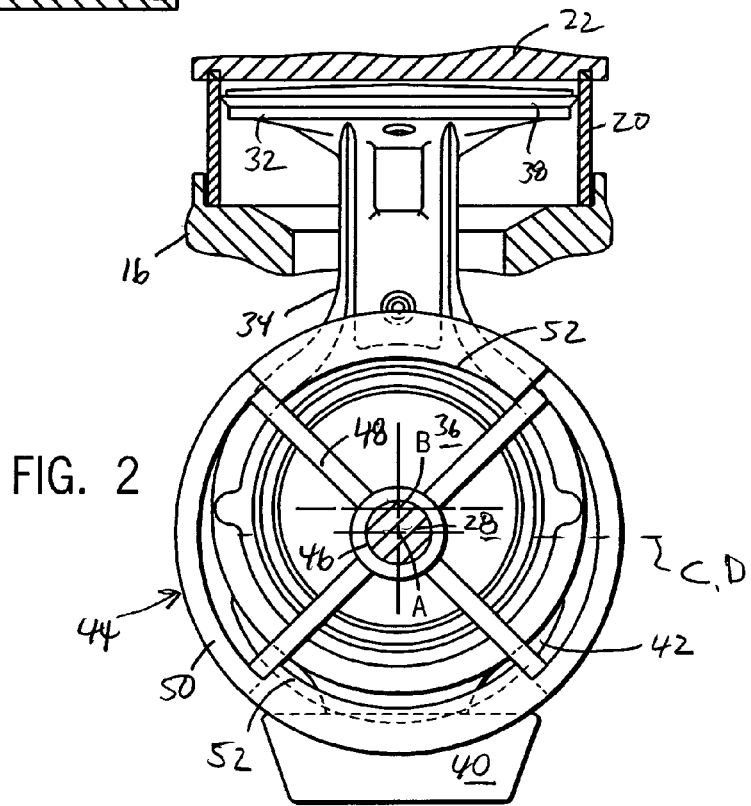
FIG. 2 is an sectional view thereof looking down a shaft axis outward from a shaft bearing.

FIGS. 1–2 illustrate a pump (in the form of a compressor) 10 having a dynamically balanced drive assembly 12 according to the present invention. Generally, the pump 10 has a motor 14 mounted at an opening of a housing or crankcase 16. The crankcase 16 has an open-ended cylindrical cavity 18 in which most of the drive assembly 12 is housed and has a smaller opening for a cylinder 20 and cylinder head 22 (with suitable valving and fittings). An internal partition 24 has an opening mounting a shaft bearing 26 in which rotates a drive shaft 28 of the motor 14 about a drive axis A.

Mounted on the drive shaft 28 is a cooling fan 29 and a piston 30 having an enlarged head 32 and a connecting rod 34. The piston 30 is mounted to the drive shaft 28 by an eccentric element 36 which is centered about an eccentric axis B spaced apart in the stroke direction from and parallel to the drive axis A. The eccentric is press fit or keyed onto the drive shaft 28, and an annular bearing is disposed in an opening in the piston connecting rod 34 between an axial nib of the eccentric 36 and the piston 30 so all the eccentric 36 can rotate with the drive shaft 28. As the drive shaft 28 rotates, the piston 30 will move in the stroke direction, which is in the direction of the long axis of the piston 30 (up and down in the figures), so that the piston head 32 reciprocates within the cylinder 20 between top and bottom dead center. The piston depicted in the drawings is a wobble piston in which the head 32 and connecting rod 34 are rigidly connected, in fact integral to one another. A thin piston ring 38 allows the piston 30 to move in this way while maintaining a seal against the inner diameter of the cylinder 20 such that air in the cylinder 20 can be pressurized during the compression stroke.

The unbalance and resulting vibration, noise and inefficiency in conventional pumps of this type are generated primarily by the momentum force generated by the reciprocating piston. This force is variable as the piston moves through its stroke, being generally maximum near top and bottom dead center and varying in between. Since the piston moves in an orbital path, there is an oscillatory component and a rotational component to this force.

The oscillatory force is converted essentially to a rotating force by the addition of a counter weight 40 located at a side of the eccentric axis B opposite the piston head 32. The counter weight 40 can be a separate part mounted to the piston 30, or it can be an integral part of the connecting rod 34 opposite the piston head 32, as shown in the figures. The mass of the counter weight 40 can be determined by size and/or material density selected to offset the mass of the piston head 32. The counter weight 40 should be arranged so the center of gravity of the assembly including the piston 30 and the counter weight 40 is centered about the eccentric axis B. The opposing masses of the piston head 32 and counter weight 40 thus balance the piston 30 by effectively transferring its center of gravity to the eccentric axis B.

The combined rotational force of the reciprocating piston 30 and counter weight 40 is countered by a counter weight 42, which in the preferred form shown in the figures is an integral lobe of the eccentric 36, 180° out of phase with the crank position of the piston. The counter weight 42 is asymmetric about the eccentric axis B, and in the embodiment shown in the figures it is also eccentric to the drive axis A such that it extends to one side of the drive axis A opposite the side which the eccentric axis B is at. Since the eccentric 36 is mounted to the drive shaft 28 the counter weight 42 rotates with the drive shaft 28, therefore, when the piston 30 is at bottom dead center the counter weight 42 will be at the upper side of the drive axis A, as shown in FIG. 1, and when the piston 30 is at top dead center it will be at the lower side of the drive axis A, as shown in FIG. 2.

The eccentric counter weight 42 is located as near as possible to the piston 30, however, because it cannot be at the centerline of the piston 30 there is necessarily some axial distance (along the drive axis A) between forces associated with counter weight 42 and the piston and counter weight 40. Thus, even though the piston is essentially balanced about the drive axis A by the two counter weights 40 and 42, there remains forces that act along the length of the drive shaft 28. Since these forces are spaced apart axially, they create a moment about a moment axis C that is perpendicular to the drive shaft 28 and its axis A. This moment or shaking couple can cause noticeable vibrations in the drive shaft.

To overcome the adverse effect of the shaking couple, the drive assembly of the present invention includes a third counter weight 44 designed to effect a counter moment on the drive shaft 28. In the preferred form shown in the figures, this counter weight 44 is an inertia wheel mounted directly (for example by key or press fit) to the drive shaft 28 having a hub 46, spokes 48, an outer ring 50, and weights 52. The illustrated inertia wheel has two weights 52 180° apart, however, a single symmetric weight could be used, as could three or more weights equally spaced about the drive axis A. In any event, the weights 52 are in angular phase with the shaking couple produced by the piston 30 and counter weights 40 and 42 and are offset from the centerline of the counter weight 44 so as to move the center of gravity of the weight portions of the inertia wheel apart in the axial direction. As the drive shaft 28 is turned, the counter weight 44 turns and the axially spaced outward forces of the weights 52 effect a moment on the drive shaft 28, about a parallel moment axis D, that is essentially equal and opposite to the shaking couple from the piston 30 and counter weights 40 and 42. In FIG. 1, the shaking couple would be in the counter-clockwise direction about moment axis C and the counter moment would be in the clockwise direction about moment axis D.

The invention thus provides a pump or compressor with decreased shaking on the drive shaft and thus lower noise and improved efficiency. It should be appreciated that preferred embodiments of the invention have been described above. However, many modifications and variations to these preferred embodiments will be apparent to those skilled in the art, which will be within the spirit and scope of the invention. For example, while a single cylinder embodiment is shown, the principles of the invention could apply to a multi-cylinder pump. For multi-cylinder pumps, the counter weights would be selected taking into account any inherent balancing that may occur from the pistons themselves, as one might expect from opposed piston arrangements. Thus, it is possible that in some piston arrangements the piston counter weight and/or the eccentric counter weight may not be necessary. It should also be noted that the rotating counter weight may be separate from the eccentric and that other piston arrangements than the wobble piston disclosed herein could be employed.

Therefore, the invention should not be limited to the described embodiment. To ascertain the full scope of the invention, the following claims should be referenced.

What is claimed is:

1. A pump drive assembly, comprising:
   a rotatable drive shaft extending along a drive axis;
   a piston eccentrically mounted to the drive shaft about an eccentric axis which revolves about the drive axis when the drive shaft is rotated so as to effect reciprocal motion to the piston;
   a counter balance assembly coupled to the piston and the drive shaft so as to essentially align oscillatory forces of the drive assembly along the eccentric axis and rotational forces of the drive assembly along the drive axis; and
   a counter moment member coupled to the drive shaft spaced along the drive axis from the piston and counter balance assembly, wherein the counter moment member applies a moment to the drive shaft essentially equal and opposite to a moment effected by the piston and counter balance assembly acting about a moment axis that is perpendicular to the drive axis.

2. The assembly of claim 1, wherein the counter moment member is an inertia wheel having a weight.

3. The assembly of claim 1, wherein the counter balance assembly includes a first weight mounted to oscillate with the piston and a second weight mounted to rotate with the drive shaft.

4. The assembly of claim 3, wherein the second weight is spaced along the drive axis from the piston.

5. The assembly of claim 3, wherein the counter balance assembly includes an eccentric mounting the piston to the drive shaft and including the second weight weighted asymmetrically about the drive axis.

6. The assembly of claim 3, wherein the first weight is mounted to a piston connecting rod at a side of the eccentric axis opposite a piston head.

7. The assembly of claim 1, further including a shaft bearing disposed about the drive axis to one side of both the counter balance assembly and counter moment member.

8. A pump, comprising;
   a motor having a drive shaft rotatable along a drive axis;
   a crankcase housing the drive shaft and having a cylinder;
   a piston eccentrically mounted to the drive shaft about an eccentric axis which revolves about the drive axis when the drive shaft is rotated so as to effect reciprocal motion to the piston within the cylinder;
   a counter balance assembly coupled to the piston and the drive shaft so as to essentially align oscillatory forces of the drive assembly along the eccentric axis and rotational forces of the drive assembly along the drive axis; and
   a counter moment member coupled to the drive shaft spaced along the drive axis from the piston and counter balance assembly, wherein the counter moment member applies a moment to the drive shaft essentially equal and opposite to a moment effected by the piston and counter balance assembly acting about a moment axis that is perpendicular to the drive axis.

9. A method of reducing vibration on a piston drive shaft of a pump, comprising:
   mounting a first weight to the piston;
   mounting a second weight to the drive shaft, wherein the first and second weights are spaced apart along a drive axis; and
   mounting a third weight to the drive shaft spaced apart along the drive axis from the piston, wherein the third weight imparts a moment on the drive shaft that is essentially equal and opposite to a moment effected by the piston and first and second weights acting about a moment axis that is perpendicular to the drive axis.

* * * * *